(12) United States Patent
Dornhelm et al.

(10) Patent No.: US 8,751,378 B2
(45) Date of Patent: Jun. 10, 2014

(54) STRATEGIC LOAN DEFAULT SCORING

(75) Inventors: Ethan Dornhelm, New York City, NY (US); Lu Gao, American Canyon, CA (US); Joanne Gaskin, Canton, MN (US); Yan Wei, Alameda, CA (US); Tracy Backes, Reno, NV (US); Andrew Leverentz, San Francisco, CA (US)

(73) Assignee: Fair Isaac Corporation, San Jose, CA (US)

( * ) Notice: Subject to any disclaimer, the term of this patent is extended or adjusted under 35 U.S.C. 154(b) by 0 days.

(21) Appl. No.: 13/399,823

(22) Filed: Feb. 17, 2012

(65) Prior Publication Data

US 2013/0218750 A1 Aug. 22, 2013

(51) Int. Cl.
*G06Q 40/00* (2012.01)

(52) U.S. Cl.
CPC ..................................... *G06Q 40/00* (2013.01)
USPC .......................................... 705/38; 705/36 R (58) Field of Classification Search
CPC ..... G06Q 40/00; G06Q 40/025; G06Q 40/02; G06Q 20/10
USPC ..................................... 705/38, 35, 36 R, 39
See application file for complete search history.

(56) References Cited

U.S. PATENT DOCUMENTS

| | | | |
|---|---|---|---|
| 8,065,234 B2 * | 11/2011 | Liao et al. ........................ | 705/44 |
| 8,452,681 B2 * | 5/2013 | Clements .................... | 705/36 R |
| 8,458,074 B2 * | 6/2013 | Showalter .................... | 705/36 R |
| 8,489,499 B2 * | 7/2013 | Yan et al. ......................... | 705/38 |
| 2009/0099959 A1 * | 4/2009 | Liao et al. ........................ | 705/38 |
| 2011/0173116 A1 * | 7/2011 | Yan et al. ......................... | 705/38 |
| 2011/0251945 A1 * | 10/2011 | Liao et al. ........................ | 705/38 |
| 2013/0218807 A1 * | 8/2013 | Liao et al. .................... | 705/36 R |
| 2013/0226706 A1 * | 8/2013 | Haggerty et al. .......... | 705/14.66 |
| 2013/0226753 A1 * | 8/2013 | Haggerty et al. ............... | 705/35 |
| 2013/0226778 A1 * | 8/2013 | Haggerty et al. ............... | 705/38 |
| 2013/0226779 A1 * | 8/2013 | Haggerty et al. ............... | 705/38 |
| 2013/0226780 A1 * | 8/2013 | Haggerty et al. ............... | 705/38 |
| 2013/0226781 A1 * | 8/2013 | Haggerty et al. ............... | 705/38 |
| 2013/0226782 A1 * | 8/2013 | Haggerty et al. ............... | 705/38 |
| 2013/0226783 A1 * | 8/2013 | Haggerty et al. ............... | 705/38 |
| 2013/0226787 A1 * | 8/2013 | Haggerty et al. ............... | 705/38 |
| 2013/0297489 A1 * | 11/2013 | Showalter ....................... | 705/38 |

OTHER PUBLICATIONS

Chinchalkar, et al. "Comparing Loan-Level Mortgage Prtofolio Analysis" Moody'S Reaserach Laves; Jul. 2010.*

* cited by examiner

*Primary Examiner* — Kelly Campen
(74) *Attorney, Agent, or Firm* — Mintz Levin Cohn Ferris Glovsky and Popeo, P.C.

(57) ABSTRACT

A strategic default score is determined for an entity that characterizes a likelihood of the entity voluntarily electing to default on a loan. Data characterizing credit data and valuation data of an asset owned by the entity is received. Using the received data, the strategic default score is generated which characterizes a likelihood of the entity to voluntarily elect to default on the loan when the entity is capable of paying-off the loan. Provision (e.g., display, transmission, storage, etc.) of the strategic default score is then initiated. Related apparatus, systems, techniques and articles are also described.

15 Claims, 12 Drawing Sheets

STRATEGIC LOAN DEFAULT SCORING

TECHNICAL FIELD

The subject matter described herein relates to determining a strategic default score for an entity that characterizes a likelihood of the entity voluntarily electing to default on a loan.

BACKGROUND

A strategic default is the decision by a borrower to stop making payments on a debt despite having the financial ability to make the payments. Strategic default is particularly associated with residential and commercial mortgages, in which case it usually occurs after a substantial drop in the price of the corresponding house such that the debt owed is (considerably) greater than the value of the property. Some studies have shown that strategic default risks exceed credit card default risk for consumers with high credit scores. Servicers that are struggling with large numbers of mortgage deficiencies are now encountering issues with borrowers voluntarily electing to cease payment of their mortgage obligations.

SUMMARY

In one aspect, a strategic default score is determined for an entity that characterizes a likelihood of the entity voluntarily electing to default on a loan is described. Data characterizing credit data and valuation data of an asset owned by the entity is received. The asset can be secured by a loan. Using the received data, the strategic default score is generated. The strategic default score characterizes a likelihood of the entity to voluntarily elect to default on the loan. Provision of the strategic default score can then be initiated.

In one variation, the generating of the strategic default score comprises determining, using the received data, a ratio of a value of the loan to a current value of the asset, the value of the loan being obtained from the credit data, the value of the asset being obtained from valuation data, determining, based on the determined ratio, a segment of a plurality of segments that is associated with the entity, and determining, using at least one determined predictive model associated with the determined segment, the strategic default score of the entity, each segment of the plurality of segments being associated with one or more corresponding predictive models that are trained using historical credit data and historical valuation data for a plurality of individuals.

The determining of the strategic default score further can further include selecting a first predictive model from the at least one predictive model. The selection can be based on a number of times the entity has defaulted on the one or more loans within a past predetermined period of time. The strategic default score can be generated by inputting the received data to the selected first predicted model.

The first predictive model can be optimized using at least one divergence-based optimization algorithm. In some implementations, the first predictive model is a scorecard model. The optimized predictive model can be scaled so that the generated strategic default score is within a predetermined range. The voluntary election can characterize defaulting on the loan when the entity is capable of paying-off the loan.

The strategic default score can characterize a likelihood of the entity to strategically default on the loan when continuing to pay other loans. The historical valuation data can comprise a value of the asset and a forecast of expected change in the value over a predetermined period of time. The provision of the strategic default score can comprise at least one of display, transmission, and storing of the strategic default score.

In an interrelated aspect, a strategic default score is determined for an entity that characterizes a likelihood of the entity voluntarily electing to default on a loan is described. Data characterizing credit data of an entity and valuation data of an asset owned by the entity is received. The asset can be secured by a loan. Based on a current loan to value ratio is then determined using the received data, a segment of a plurality of segments that can be associated with the entity can be determined. By inputting the received data to a predictive model selected from at least two predictive models associated with the determined segment, the strategic default score of the entity is determined and provision of such score can then be initiated.

In one variation, the generating of the strategic default score further comprises selecting a first predictive model from the at least one predictive model. The selection can be based on a number of times the entity has defaulted on the one or more loans within a past predetermined period of time. The strategic default score can be generated by inputting the received data to the selected first predicted model. The first predictive model can be a scorecard model.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. By identifying entities that are likely to strategically default on their loans, loan servicers can be proactive and offer alternatives (i.e., various treatments, etc.) to the entities in an effort to minimize their potential losses.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
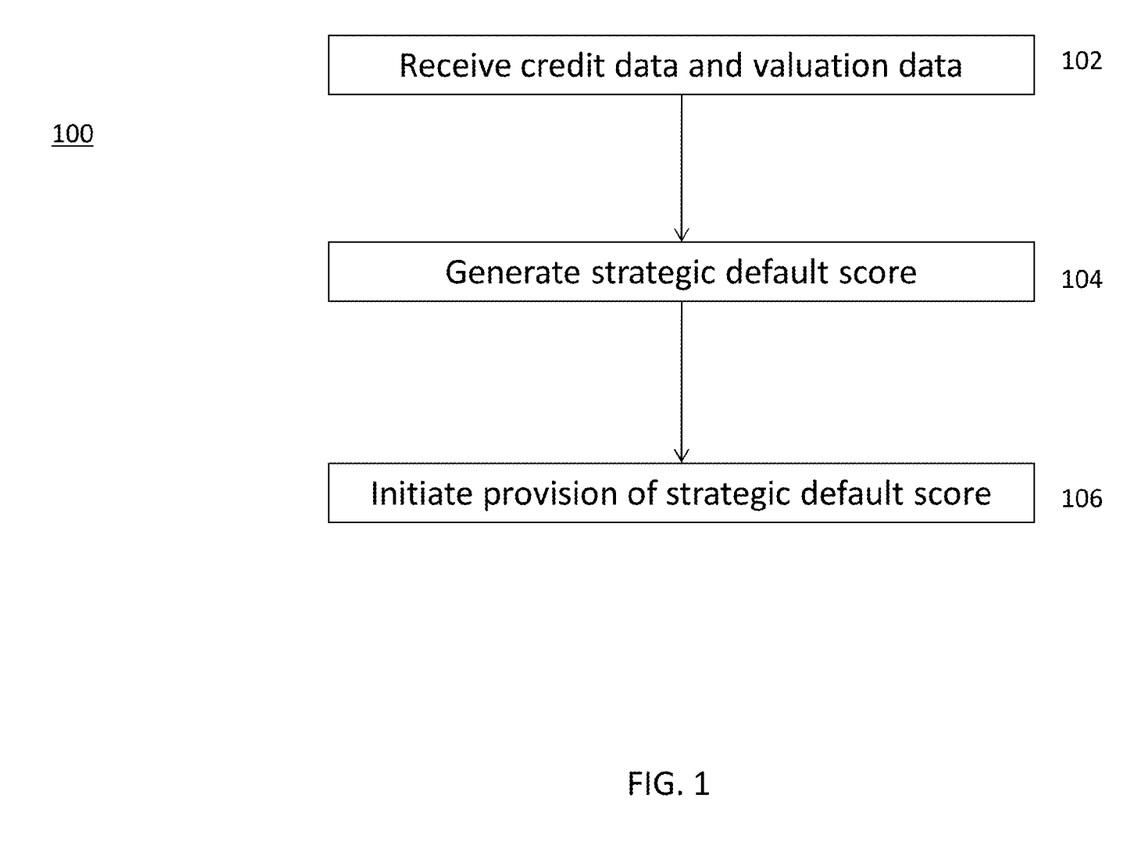
FIG. 1 is a process flow diagram that illustrates the generation of a strategic default score.

FIG. 1 is a process flow diagram 100 that illustrates the generation of a strategic default risk score. Data is received, at 102, that characterizes credit data of an entity and valuation data of an asset owned by the entity that is secured by a loan. The received data is used, at 104, to generate a strategic default score for an entity that indicates a likelihood of the entity voluntarily electing to default (i.e. strategically defaults) on the loan. Provision of the strategic default score of the entity is, at 106, then initiated.

The credit data used by the model can include at least one of data associated with one or more credit bureau reports, which can be provided by a credit bureau, such as EQUIFAX, EXPERIAN, TRANSUNION, and the like. Such credit reports can provide data for one or more years. These one or more credit bureau reports can be provided using a service (e.g. web service) over a network, such as an internet or an intranet. The credit data of the entity can include at least one of credit score, a number of total loans obtained by the entity in past predetermined amounts of time (e.g. 6 months, 1 year, 2 years, etc.), number of loans of the total loans on which the entity has defaulted, number of times the entity has defaulted on each loan associated with the defaulting, specification of the loans (e.g. auto loans, real-estate loans, education loans, etc.), utilization of the loans, and the like.

The valuation data can include data associated with one or more valuation reports, which can be provided by one or more property valuation service providers, such as COLLATERAL ANALYTICS. These one or more valuation reports can be provided using a service (e.g. web service) over a network, such as an internet or an intranet. The valuation data can include an estimate (including both low-side estimate and high-side estimate) of the asset, a confidence score indicating a level of confidence associated with the estimate, a forecast of an expected percentage change in the estimated value of the asset in a first predetermined period (e.g. 6 months), and a forecast of an expected percentage change in the estimated value of the asset in a second predetermined period (e.g. 12 months), and the like. Although the above-mentioned valuation data is described, other implementations can additionally include the following valuation data: comparable sales listing, location map, and additional charts and detail on local and regional real estate pricing trends.

The strategic default score is generated for an entity that voluntarily elects to default (i.e. strategically defaults) on the loan (104). The voluntary default on the loan can be characterized by a default when the entity is capable of paying-off the loan. In one implementation, the capability of paying-off the loan can be determined based on payment of other one or more loans, when the entity has those other loans. The strategic default score can characterize a likelihood of the entity to strategically default (e.g. voluntarily elect to default) on the loan. This voluntary election can characterize defaulting on the loan when the entity is capable of paying-off the loan. In some implementations, the capability of paying-off of the loan is characterized by a continuation of paying-off of other loans that the entity has. In some other implementations, the capability of paying-off of the loan can be characterized by at least one of one or more bank balances of the entity, number and values of properties owned by the entity, money invested by the entity in financial instruments (e.g. 401(k), stocks, bonds/securities, mutual funds, exchange traded funds, futures, options, swaps, treasury bills, certificates of deposit, commercial paper, and the like). The generation of the strategic default score is described further below.

The strategic default score of the entity is provided (106); and as used herein, provided can include, for example, displaying, transmitting, and/or storing the strategic default score.

Figure 2:
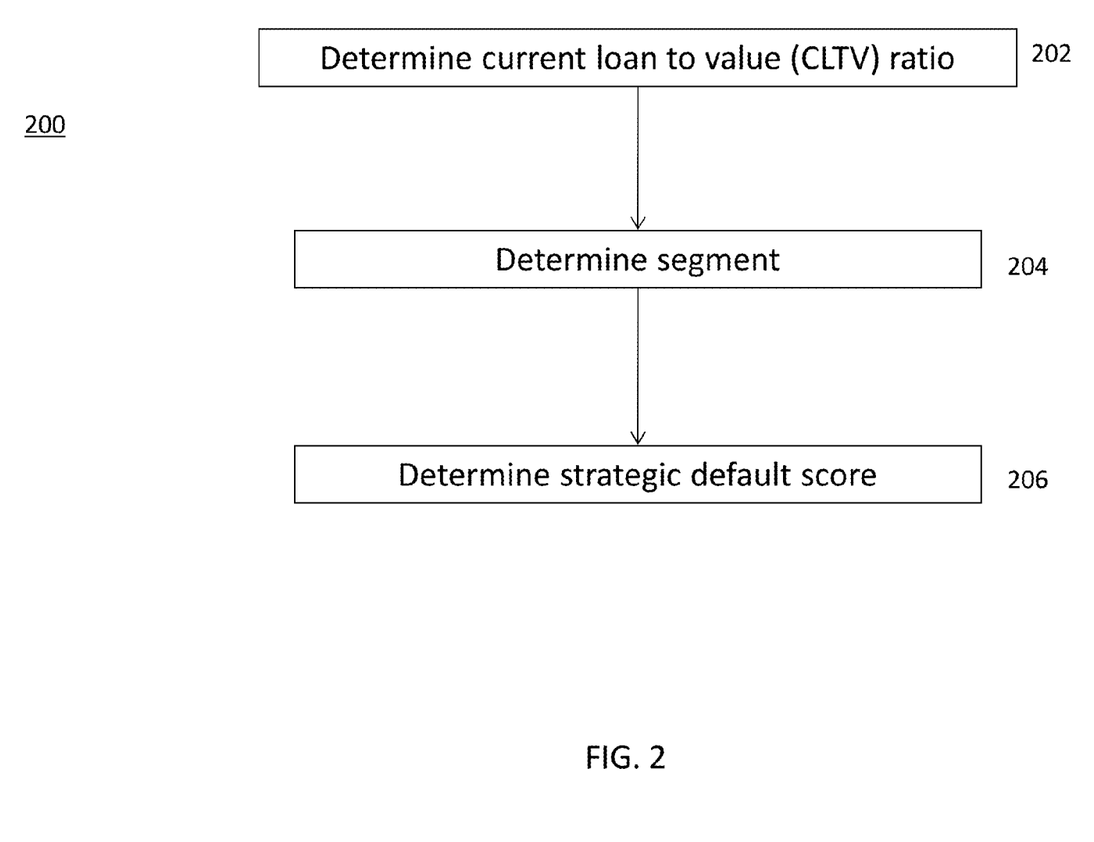
FIG. 2 is a process flow diagram that illustrates aspects of a method to generate a strategic default score.

FIG. 2 is a process flow diagram 200 that illustrates aspects of a method to generate a strategic default score. The valuation data received is used, at 202, to determine a ratio of a current value of the loan to a current value of the asset. Based on the determined ratio and a number of other (other than the loan on which the entity strategically defaults) one or more loans (e.g. active loans) for which the entity continues to pay-off, a segment of a plurality of segments that is associated with the strategically defaulting entity is, at 204, determined. At least one predictive model (which can be an optimized and/or a scaled predictive model) associated with the determined segment is used, at 206, to determine/generate the strategic default score. Each segment of the plurality of segments is associated with one or more corresponding predictive models that are trained using historical credit data and historical valuation data for a plurality of individuals (e.g. third party entities).

The ratio of the loan to a current value of the asset can be a current loan to value (CLTV) ratio. In one example, the current loan to value (CLTV) ratio can be represented mathematically as follows:

$$CLTV = \frac{\text{Total Debt on Property as of October 2008}}{\text{Estimate of Property Value as of October 2008}}$$

In the above-noted example, a value of the numerator (i.e., total debt on property as of October 2008) can be determined from the credit data included in the received data, and a value of the denominator (i.e., estimate of property value as of October 2008) can be determined from the valuation data included in the received data.

The segment associated with the strategically defaulting entity is determined based on other one or more loans (204). Such other loans can also be referred to as active loans, which characterize one or more loans that are being paid-off. Table 1 below lists segments, which can also be referred to as nodes, corresponding to a respective number of active loans and a respective validity and value of the current loan to value (CLTV) ratio.

TABLE 1

| Segment/Node | Criteria for allocating a segment |
|---|---|
| Segment/Node 1 | 1 active loan; invalid CLTV ratio |
| Segment/Node 2 | 1 active loan; CLTV ratio < 0.95 (or 95%) |

TABLE 1-continued

| Segment/Node | Criteria for allocating a segment |
|---|---|
| Segment/Node 3 | 1 active loan; CLTV ratio >= 0.95 (or 95%) |
| Segment/Node 4 | 2+ active loans |

Each segment can be associated with two corresponding predictive models. In one implementation, these predictive models can be scorecards. Although scorecards have been described, other predictive models can also be used either individually or in combination. These other predictive models can include neural network models, group method of data handling, naïve Bayesian classifier, majority classifier, support vector machines, logistic regression, uplift modeling, and the like.

A predictive model to be used for the entity associated with a corresponding determined segment can be selected based on a number of times the entity has been late by more than a predetermined time period for paying on loans in a past predetermined period of time. In one example: if the entity has not been late by more than 30 days to pay a loan in the past 6 months (i.e. the entity is likely to strategically default but may not have completely stopped making payments and can at least make late payments—entity with a high strategic default score), a first predictive model can be used; and if the entity has been late by more than 30 days to pay a loan in the past 6 months (i.e. entity has already strategically defaulted and there is less likelihood/probability of continuing to make even late payments—entity with a low strategic default score), a second predictive model can be used. Use of two predictive models for each segment is advantageous, as a different strategic model can be used based on whether the strategic defaulter is likely to default and a complete default (i.e. complete stop of more payments, including late payments) can be prevented or whether the strategic defaulter has already defaulted and it is harder to prevent a complete default (complete stop of more payments, including late payments).

Although the use of two predictive models have been described, more than two predictive models can be used in some other implementations. For example: if the entity has not been late by more than 30 days to pay a loan in the past 6 months, a first predictive model can be used; if the entity has been late once by more than 30 days to pay a loan in the past 6 months, a second predictive model can be used; if the entity has been late twice by more than 30 days to pay a loan in the past 6 months, a third predictive model can be used; and so on. Thus, a suitable predictive model can be advantageously used/selected based on a likelihood/probability of a complete default (complete stop of more payments, including late payments) on a loan.

These predictive models can be trained using historical credit data and historical valuation data for a plurality of individuals (e.g. third party entities). In some implementations, the historical valuation data can include historical data for the entity. The historical credit data and the historical valuation data can be obtained for a predetermined time period. For example, the historical credit data and the historical valuation data can be obtained from a period of October 2008 to October 2009. The historical credit data and the historical valuation data can be data for multiple years, so that some implementations can consider a change of data, a velocity of the change of the data, and the like.

The historical credit data can include at least one of data associated with credit bureau reports (e.g. credit bureau reports for multiple years). The credit bureau reports can be provided by a credit bureau, such as EQUIFAX, EXPERIAN, TRANSUNION, and the like. The historical credit data of the individuals (e.g. third party entities) can include at least one of average values, median values, mode values, and other mathematical values (i.e., values computed using a mathematical or statistical operation or equation) of at least one of the following factors for the individuals (e.g. third party entities): credit scores, a number of total loans obtained by the individuals (e.g. third party entities) in past predetermined amounts of time (e.g. 6 months, 1 year, 2 years, etc.), number of loans of the total loans on which the individuals (e.g. third party entities) have defaulted, number of times individuals (e.g. third party entities) have defaulted on each loan associated with the defaulting, specification of the loans (e.g. auto loans, real-estate loans, education loans, etc.), utilization of the loans, and the like.

The historical valuation data can include data associated with valuation reports of the individuals (e.g. third party entities). The valuation reports can be provided by property valuation service providers, such as COLLATERAL ANALYTICS. The historical valuation data can include at least one of average values, median values, mode values, and other mathematical values (i.e., values computed using a mathematical or statistical operation or equation) of the following factors for the individuals (e.g. third party entities): an estimate (including both low-side estimate and high-side estimate) of the asset, a confidence score indicating a level of confidence associated with the estimate, a forecast of an expected percentage change in the estimated value of the asset in a first predetermined period (e.g. 6 months), a forecast of an expected percentage change in the estimated value of the asset in a second predetermined period (e.g. 12 months), and the like. Although the above-mentioned historical valuation data is described, other implementations can include the following data in the historical valuation data: comparable sales listing, location map, and additional charts and detail on local and regional real estate pricing trends.

The selected predictive model can be optimized using a divergence-based optimization algorithm so that strategic default scores that are generated for a non-defaulter and a defaulter can be clearly distinct and far-apart. That is, the optimization allows maximizing a separation of the non-defaulter individuals and the strategic-defaulter individuals. For example, for Table 2 shown below, difference in strategic default scores of two entities associated with two separate descriptions (i.e. two separate performance classifications) can be directly proportional to the difference in the associated values mentioned in Table 2. The optimization performed by the divergence-based optimization algorithms can include at least one of combinatorial optimization, dynamic programming, evolutionary algorithms, stochastic optimization, and the like.

TABLE 2

| Value | Description (Performance classification) |
|---|---|
| 9 | There is at least one input variable that is required to calculate performance is missing |
| 8 | There are no active real-estate accounts during a 12 month performance window |
| 7 | There is no 90+ days past due delinquency on real estate loans in the 12 month performance window |
| 6 | There are one or more real estate loans for which a loan modification occurred |
| 5 | Bankruptcy is filed in the 12 month performance window |
| 4 | There are one or more real estate loans for which a short sale or deed-in-lieu occurred |
| 3 | There are no active credit accounts during the 12 month performance window other than real estate loans |

TABLE 2-continued

| Value | Description (Performance classification) |
|---|---|
| 2 | 30+ days past due delinquency on non-real-estate loans |
| 1 | Strategic defaulter |

For purpose of Table 2, if description/performance-classification of an entity matches two or more descriptions/performance-classifications in Table 2, then the entity can be associated with the description/performance-classification corresponding to the highest associated value. The optimized predictive model can be scaled so that the strategic default score lies within a predetermined range.

The optimized and scaled selected predictive model can be used to generate the strategic default score. The received data that includes the credit data and the valuation data of the entity can be input to the scaled predictive model so as to receive an output in the form of a strategic default score.

Based on the determined strategic default score, a treatment of the strategically defaulting entities can be performed. The treatment of an entity can vary based on the strategic default score. For entities that are likely to be strategic defaulters and have not completely stopped making payments and have been making late payments (i.e. entities with a high strategic default score), the treatment is performed so that those entities act early to prevent delinquency and so that they better understand portfolio valuation. For entities that have already strategic defaulted and have a less likelihood to even make late payments (i.e. entities with a low strategic default score), the treatment is performed so as to induce self-cure in those entities, thereby reducing the frequency of strategic default.

The treatment for entities that are likely to strategically default (i.e. entities with a high strategic default score) can include at least one of the following: (a) provision of consumer education, which can be via internet, hard-copy documents, and the like; (b) offer of financial instruments (e.g. myFICO® Standard, FICO® Score Watch®, and the like) to model financial impacts and monitor credit score; (c) increased cost of credit for new loans; (d) intimation regarding an impact of strategic default on credit score and regarding time taken to recover from the impacted credit score to the credit score before the strategic default; (e) lock-out strategic defaulters from obtaining prime rates on loans for a predetermined amount of time (e.g. 7 years); and the like. The treatment for entities that have already strategically defaulted (i.e. entities with a high strategic default score) can additionally include at least one of the following: (a) provision of education materials that emphasize that it is not too late to pay-off; (b) provision of details of policies and/or judgments regarding default; and the like.

Such treatments can at least reduce a frequency of strategic default, thereby reducing total number of strategic defaults and reducing/minimizing a business loss of the loan-providing institutions, such as banks, credit unions, and the like. Experiments on a population of entities reveal that (i) identification of 30% (125,000 entities) of the population that is likely to strategically default, and (ii) a subsequent treatment to reduce 10% of strategic defaults of the identified population, can prevent a loss of $30 million of one or more loan-providing institutions, such as banks, credit unions, and the like. Further experiments on a population of entities reveal that (i) identification of 30% (12,000 entities) of the population that have already strategically defaulted, and (ii) a subsequent treatment to reduce 10% of strategic defaults of the identified population, can prevent a loss of $ 10.5 million of one or more loan-providing institutions, such as banks, credit unions, and the like.

Figure 3A:
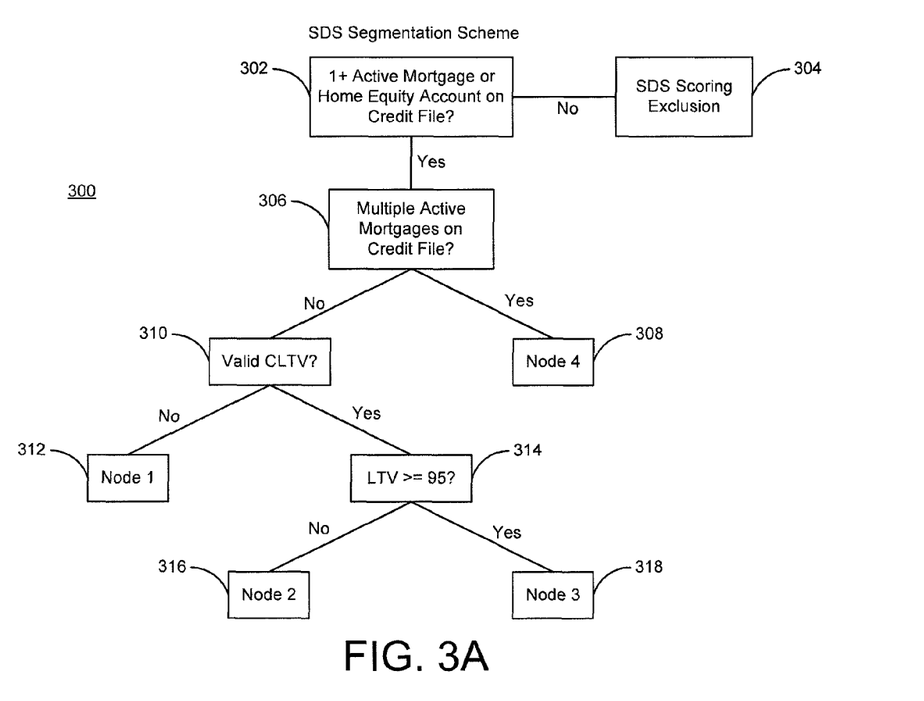
FIG. 3A is a flow chart that illustrates a method of determining a segment of a plurality of segments that is to be associated with the strategically defaulting entity.

FIG. 3A is a flow chart 300 that illustrates a method of determining a segment of a plurality of segments that is to be associated with the strategically defaulting (204). In some implementations consistent with FIG. 3A, it can be assumed that strategically defaulting characterizes voluntarily defaulting on one loan while continuing to pay-off other one or more loans. Thus, for strategically defaulting, some implementations require that an entity must have at least two loans.

It can be determined, at 302, whether an entity has two or more loans. If the entity does not have two or more loans, the entity may not be a strategic defaulter, and a strategic default score may not be calculated; thus, such entity can be excluded, at 304, from a plurality of entities for which strategic default score is to be calculated. With respect to some implementations consistent with FIG. 3A, although a criteria for being a strategic defaulter is described as being associated with two or more loans, other criteria can also be possible, such as bank balance, property, expenses, change in expenses over a predetermined period of time, vehicles owned, and the like. If the entity has two or more loans, it can be determined, at 306, whether at least one of the two or more loans is an active loan (i.e., a loan for which the entity is making payments). If more than one loan of the two or more loans is an active loan, segment/node 4 (see Table 1) can be allocated-to/associated-with the entity at 308. If more than one loan of the two or more loans is not an active loan, it can be determined, at 310, whether the current loan to value (CLTV) ratio is a valid ratio. If the current loan to value (CLTV) ratio is not a valid ratio, segment/node 1 (see Table 1) can be allocated-to/associated-with the entity at 312. If the current loan to value (CLTV) ratio is a valid ratio, it can be determined, at 314, whether the current loan to value (CLTV) ratio is greater than or equal to 0.95 (or 95%). If the current loan to value (CLTV) ratio is not greater than or equal to 0.95 (or 95%), segment/node 2 (see Table 1) can be allocated-to/associated-with the entity at 316. If the current loan to value (CLTV) ratio is greater than or equal to 0.95 (or 95%), segment/node 3 (see Table 1) can be allocated-to/associated-with the entity at 318.

Figure 3B:
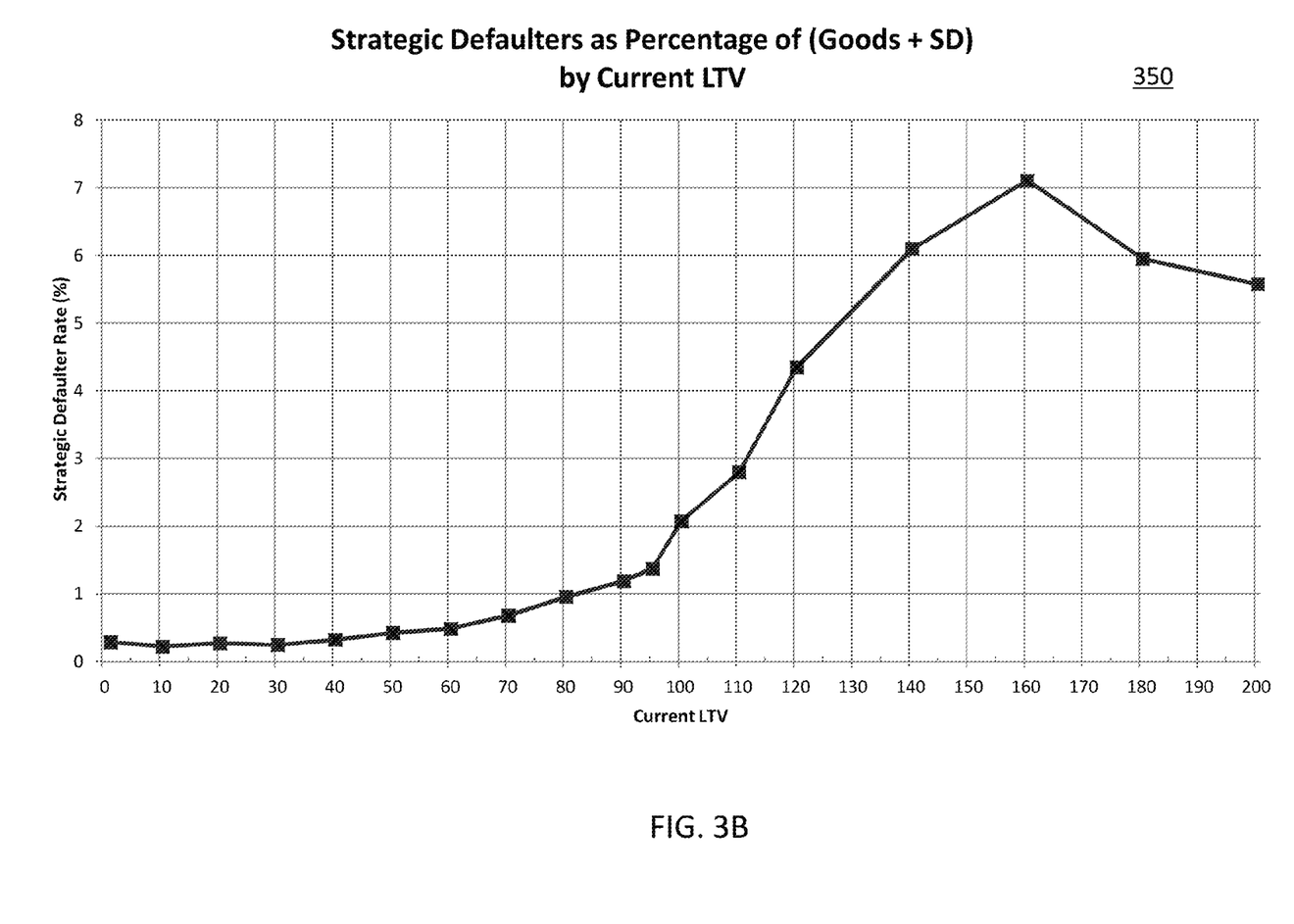
FIG. 3B is a graph that illustrates strategic default rate as a function of current loan to value (CLTV) ratio.

FIG. 3B is a graph 350 that illustrates strategic default rate as a function of current loan to value (CLTV) ratio. The graph 350 can be generated based on experimental data. The graph 350 shows that at a CLTV ratio of 0.95 or 95%, the strategic default rate begins to spike/shoot/go up. Accordingly, predictive models used for strategic defaulters with CLTV>=0.95 can differ from predictive models used for strategic defaulters with CLTV<0.95. Therefore, the segmentation described with respect to FIG. 2 (e.g. reference numeral 204), FIG. 3A (reference numeral 314), and table 1 can use 0.95 or 95% threshold to determine a segment.

In some implementations described above, each segment can be associated with corresponding one or more predictive models (and therefore, the descriptions/performance-classifications, as described in Table 2). However, in some other implementations, segmentation (as illustrated in FIG. 3) may not be required/performed such that the entire population of entities can be associated with a single predictive model rather than a separate predictive model for each separate segment of the population of entities.

Further, in some implementations, the descriptions/performance-classifications can be optionally scaled such that there are two new descriptions/performance-classifications. For example, the two new descriptions/performance-classifications can be (a) strategic defaulter that corresponds to value 1 and corresponding neighboring values, and (b) non-defaulting entity that corresponds to value 9 and corresponding neighboring values, wherein the values correspond to values described in Table 2. Thus, such a scaling can enable the single predictive model to use a simple binary-outcome scenario rather than a multi(more-than-two)-outcome scenario.

Figure 4:
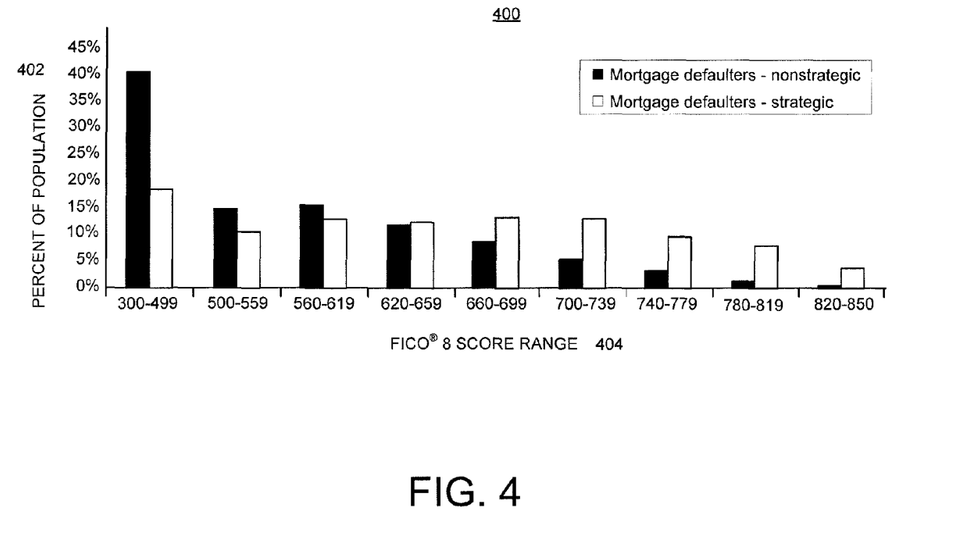
FIG. 4 is a bar chart that illustrates a percentage population of strategic defaulters for various credit score ranges.

FIG. 4 is a bar chart 400 that illustrates a percentage population 402 of strategic defaulters for various credit score (e.g. FICO 8 score) ranges 404. Strategic default score of these strategic defaulters can be determined/generated/provided by implementations described herein (e.g. see FIGS. 1-3A and associated text). The bar chart 400 shows that odds/probability of a defaulter being strategic can increase towards higher credit score ranges. The bar chart 400 can be generated using an experimental collection of data.

Figure 5:
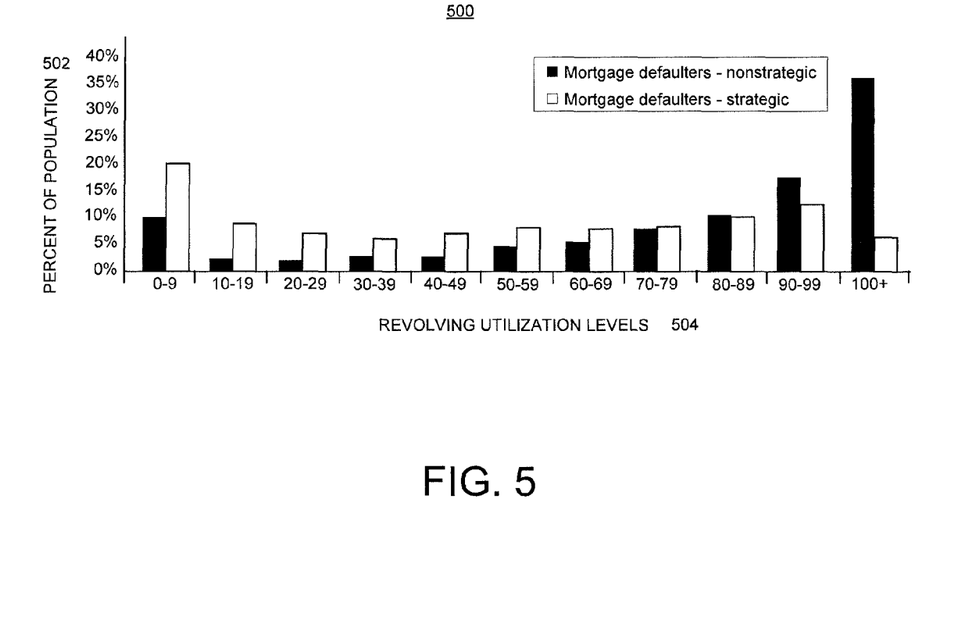
FIG. 5 is a bar chart that illustrates a percentage population of strategic defaulters for various revolving utilization levels.

FIG. 5 is a bar chart 500 that illustrates a percentage population 502 of strategic defaulters for various revolving utilization levels 504. A utilization level can characterize a percentage of credit-limit that is being used. Strategic default score of these strategic defaulters can be determined/generated/provided by implementations described herein (e.g. see FIGS. 1-3A and associated text). The bar chart 500 shows that behavior patterns of strategic defaulters can be distinct from behavior patterns of other defaulters. The bar chart 500 can be generated using an experimental collection of data.

Based on bar charts 400, 500, and similar analyzed data, it can be possible for the strategic defaulters to be characterized by at least one of the following factors as compared to factors for non-strategic defaulters: (1) a better credit score (e.g. FICO score) that can characterize a better credit history; (2) lower utilization; (3) lesser limit on credit card that can characterize a better credit management; (4) lesser retail balance that can characterize a more careful spending of money; (5) shorter length of residence in the property that can characterize lesser attachment with property; (6) more open credit in a past predetermined time period (e.g. six months); and the like.

Figure 6:
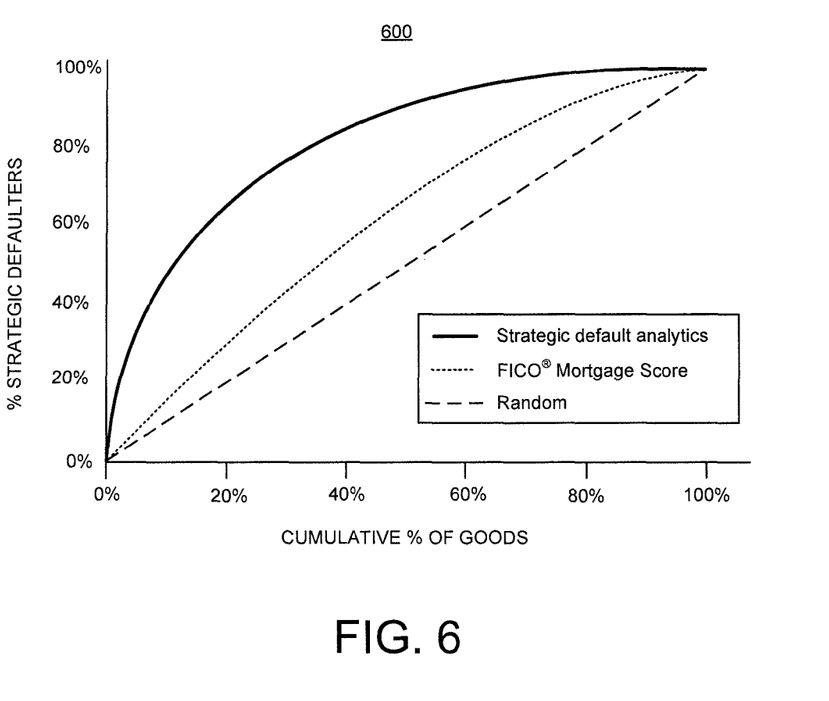
FIG. 6 is a graph that illustrates benefits of using a strategic default score over using a credit score for identifying strategic defaulters that default on a loan while continuing paying-off other non-delinquent loans.

FIG. 6 is a graph 600 that illustrates benefits of using a strategic default score over using a credit score for identifying strategic defaulters that default on a loan while continuing to pay-off other non-delinquent loans. The strategic default score can be determined/generated/provided by implementations described herein (e.g. see FIGS. 1-3 and associated text).

Figure 7:
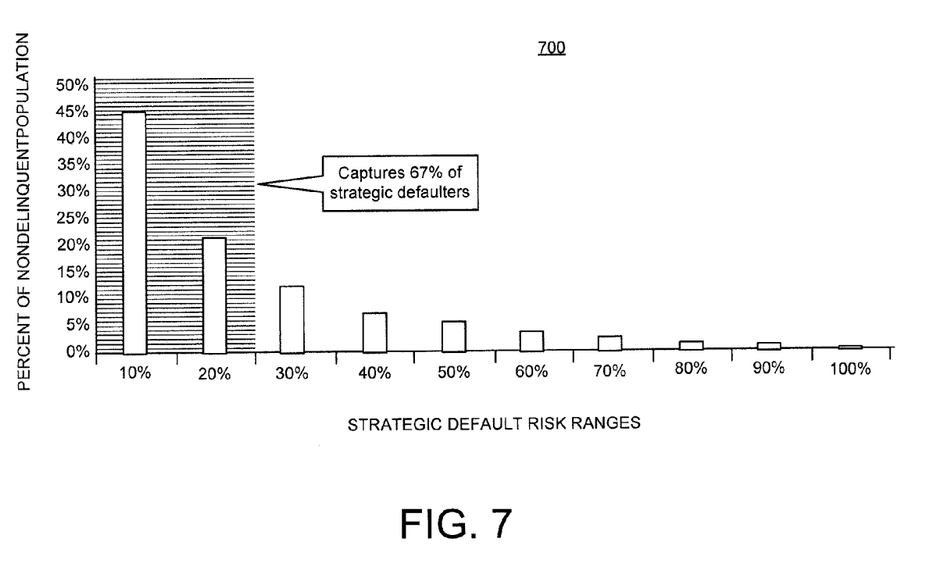
FIG. 7 is a bar chart that illustrates presence of a majority/bulk of strategic defaulters, as identified in FIG. 6, in some strategic default risk ranges.

FIG. 7 is a bar chart 700 that illustrates presence of a majority/bulk of strategic defaulters, as identified in FIG. 6, in some strategic default risk ranges. For example, as per the illustrated implementation, 67% of the strategic defaulters can be associated with a 0%-20% strategic default risk range.

Figure 8:
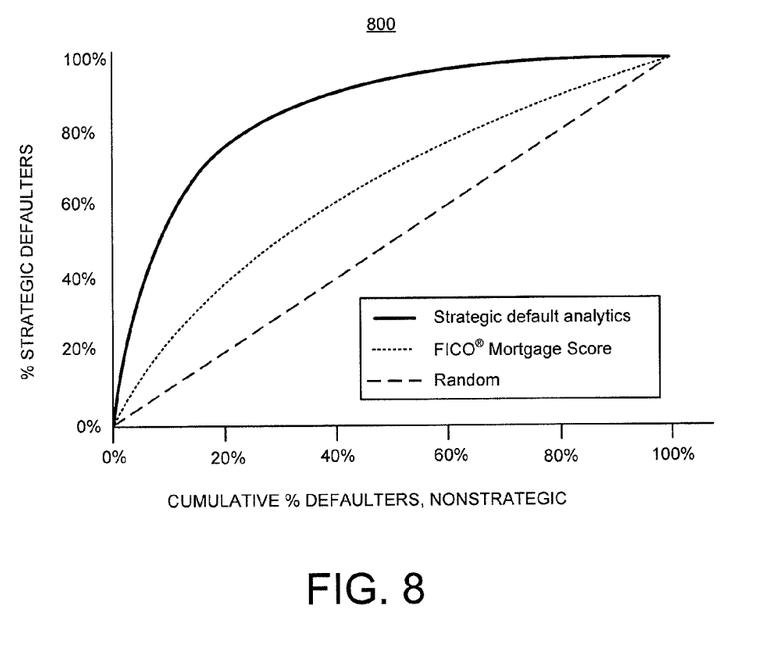
FIG. 8 is a graph that illustrates benefits of using a strategic default score over using a credit score for identifying strategic defaulters that default on a loan while continuing paying-off other loans that have been delinquent in the past for more than a predetermined period of time.

FIG. 8 is a graph 800 that illustrates benefits of using a strategic default score over using a credit score for identifying strategic defaulters that default on a loan while continuing paying-off other loans that have been delinquent in the past for more than a predetermined period of time (e.g. 30 days).

Figure 9:
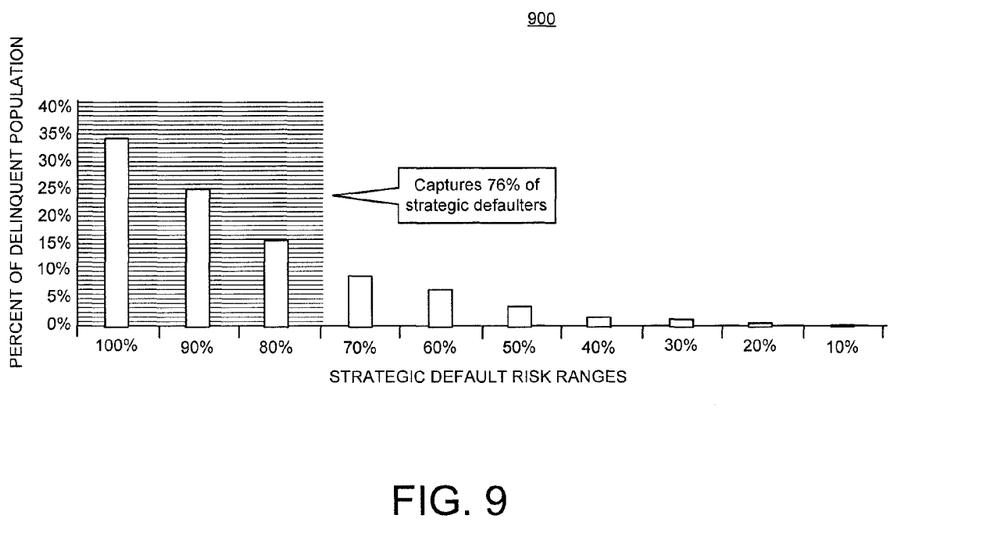
FIG. 9 is a bar chart that illustrates presence of a majority/bulk of strategic defaulters, as identified in FIG. 8, in some strategic default risk ranges.

FIG. 9 is a bar chart 900 that illustrates presence of a majority of strategic defaulters, as identified in FIG. 8, in some strategic default risk ranges. For example, as per the illustrated implementation, 76% of the strategic defaulters can be associated with a 70%-100% risk range.

Figure 10:
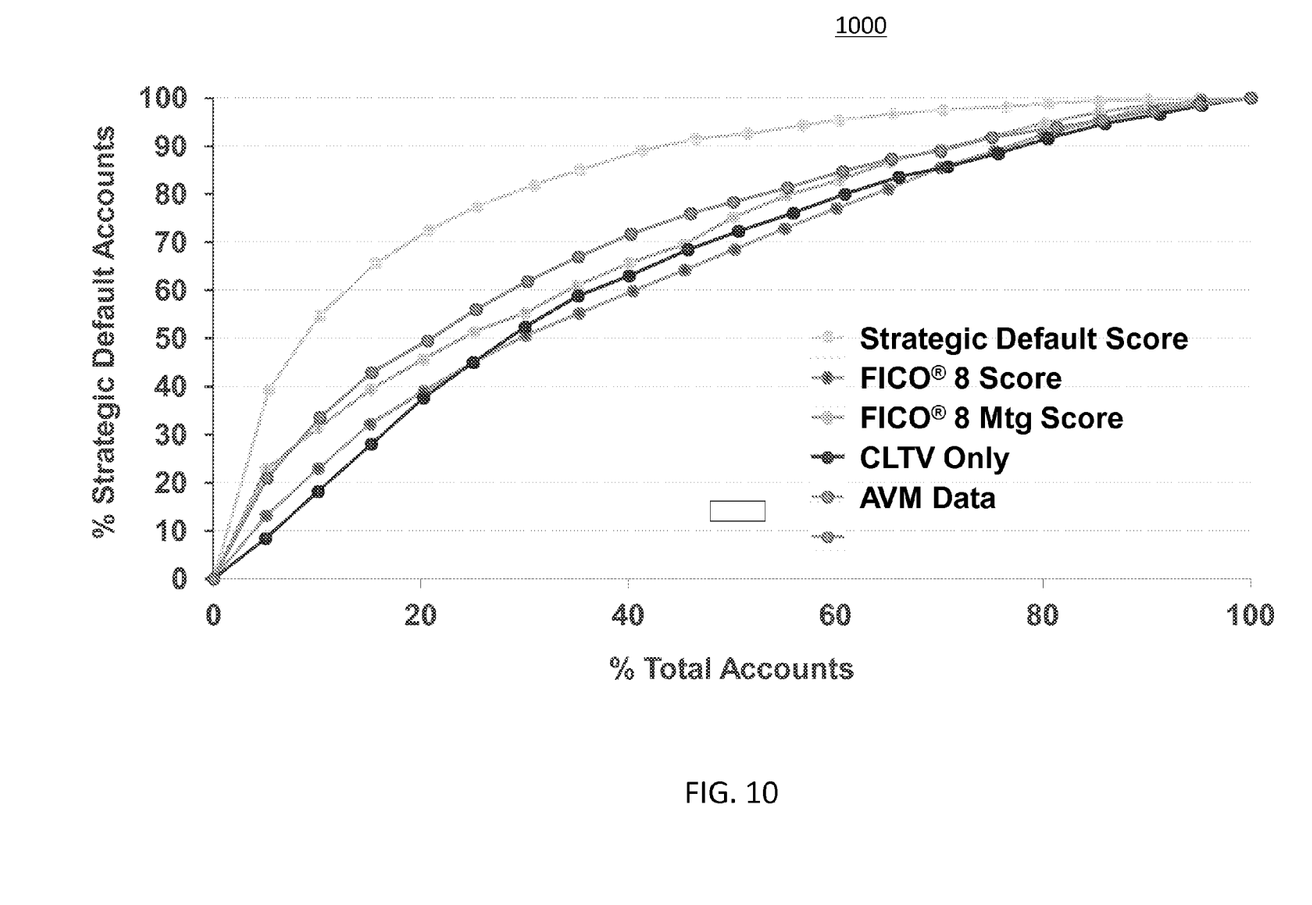
FIG. 10 is a graph that illustrates benefits of using a strategic default score over using other measures for identifying strategic defaulters.

FIG. 10 is a graph 1000 that illustrates benefits of using a strategic default score over using other measures for identifying strategic defaulters, the other measures including credit score (e.g. FICO® 8 score, FICO® 8 Mtg score, etc.), current loan to value (CLTV) ratio, asset value (e.g. AVM) data, and the like.

Figure 11:
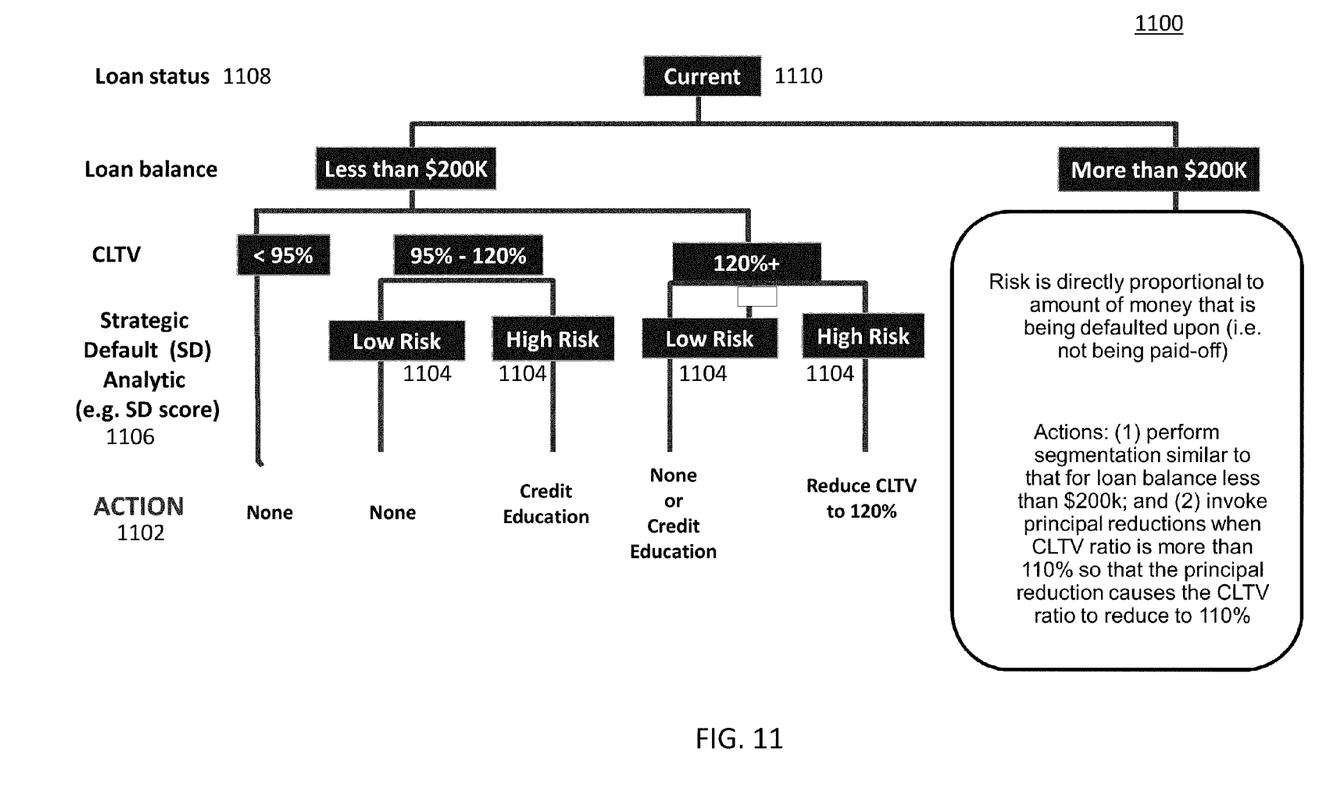
FIG. 11 is a diagram 1100 that illustrates performance of an action based on a risk determined using strategic default analytics, such as a strategic default score.

FIG. 11 is a diagram 1100 that illustrates performance of an action 1102 based on a risk 1104 determined using strategic default analytics 1106, such as a strategic default score. The action 1102 can be performed by a financial institution (e.g. bank, loan agency, and the like) that gives out loans on which a strategic defaulter can default. The loan status 1108 can be either current 1110 or delinquent (not shown in FIG. 11). For a current loan status 1110, when a strategic defaulter defaults on one loan, the strategic defaulter can continue to pay-off other loans without making any late payments. For a delinquent loan status, when a strategic defaulter defaults on one loan, the strategic defaulter can continue to pay-off other loans with one or more late payments within a predetermined past period of time (e.g. past 6 months).

The term entity, as used herein, includes at least one of an individual, a human being, a married couple, a company, an association, a group, and the like.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:
   receiving, by at least one data processor, data characterizing credit data of an entity and valuation data of an asset owned by the entity, the asset being secured by a loan of one or more loans;
   generating, by at least one data processor using the received data, a strategic default score for the entity, the strategic default score indicating that the entity will to voluntarily elect to default on the loan while the entity is capable of paying off the loan and/or while the entity continues to pay other loans, the generating comprising:
      determining, by at least one data processor using the received data, a ratio of a value of the loan to a current value of the asset, the value of the loan being obtained from the credit data, the value of the asset being obtained from valuation data;
      determining, by at least one data processor and based on the determined ratio, a segment of a plurality of segments that is associated with the entity;
      selecting, by at least one data processor, a first predictive model among a plurality of predictive models based on the determined segment; and
      determining, by at least one data processor and using the selected first predictive model, the strategic default score of the entity, each segment of the plurality of segments being associated with one or more corresponding predictive models that are trained using historical credit data for a plurality of individuals and with historical valuation data for a plurality individuals; and
   initiating, by at least one data processor, a provision of the strategic default score.

2. The method of claim 1, wherein the first predictive model is optimized using at least one divergence-based optimization algorithm.

3. The method of claim 2, wherein the optimized predictive model is scaled so that the generated strategic default score is within a predetermined range.

4. The method of claim 1, wherein the historical valuation data for each asset comprises a value of the asset and a forecast of expected change in the value over a predetermined period of time.

5. The method of claim 1, wherein the provision of the strategic default score comprises at least one of display, transmission, and storing of the strategic default score.

6. A non-transitory computer program product storing instructions which, when implemented by one or more data processors forming part of at least one computing system, result in operations comprising:
   receiving, by at least one data processor, data characterizing credit data of an entity and valuation data of an asset owned by the entity, the asset being secured by a loan of one or more loans;
   generating, by at least one data processor using the received data, a strategic default score for the entity, the strategic default score indicating that the entity will voluntarily elect to default on the loan while the entity is capable of paying off the loan and/or while the entity continues to pay other loans, the generating comprising:
      determining, using the received data, a ratio of a value of the loan to a current value of the asset, the value of the loan being obtained from the credit data, the value of the asset being obtained from valuation data;
      determining, based on the determined ratio, a segment of a plurality of segments that is associated with the entity;
      selecting a first predictive model among a plurality of predictive models based on the determined segment; and
      determining, using the selected first predictive model, the strategic default score of the entity, each segment of the plurality of segments being associated with one or more corresponding predictive models that are trained using historical credit data for a plurality of individuals and with historical valuation data for a plurality of assets corresponding to the plurality of individuals; and
   initiating provision of the strategic default score.

7. The computer program product of claim 6, wherein the first predictive model is optimized using at least one divergence-based optimization algorithm.

8. The computer program product of claim 7, wherein the optimized predictive model is scaled so that the generated strategic default score is within a predetermined range.

9. The computer program product of claim 6, wherein the historical valuation data for each asset comprises a value of the asset and a forecast of expected change in the value over a predetermined period of time.

10. The computer program product of claim 6, wherein the provision of the strategic default score comprises at least one of display, transmission, and storing of the strategic default score.

11. A system comprising:
   at least one data processor; and
   memory storing instructions which, when implemented by the at least one data processor, result in operations comprising:
   receiving, by at least one data processor, data characterizing credit data of an entity and valuation data of an asset owned by the entity, the asset being secured by a loan of one or more loans;
   generating, by at least one data processor using the received data, a strategic default score for the entity, the strategic default score indicating that the entity will voluntarily elect to default on the loan while the entity is capable of paying off the loan and/or while the entity continues to pay other loans, the generating comprising:
      determining, by at least one data processor using the received data, a ratio of a value of the loan to a current value of the asset, the value of the loan being obtained from the credit data, the value of the asset being obtained from valuation data;

determining, by at least one data processor and based on the determined ratio, a segment of a plurality of segments that is associated with the entity;

selecting a first predictive model among a plurality of predictive models based on the determined segment; and determining, by at least one data processor and using the selected first predictive model, the strategic default score of the entity, each segment of the plurality of segments being associated with one or more corresponding predictive models that are trained using historical credit data for a plurality of individuals and with historical valuation data for a plurality of assets corresponding to the plurality of individuals; and initiating, by at least one data processor, a provision of the strategic default score.

12. The system of claim 11, wherein the first predictive model is optimized using at least one divergence-based optimization algorithm.

13. The system of claim 12, wherein the optimized predictive model is scaled so that the generated strategic default score is within a predetermined range.

14. The system of claim 11, wherein the historical valuation data for each asset comprises a value of the asset and a forecast of expected change in the value over a predetermined period of time.

15. The system of claim 11, wherein the provision of the strategic default score comprises at least one of display, transmission, and storing of the strategic default score.

* * * * *